United States Patent [19]

Matsumoto et al.

[11] Patent Number: 4,547,086
[45] Date of Patent: Oct. 15, 1985

[54] PIEZOELECTRICALLY DRIVEN PRINTING MECHANISM FOR DOT MATRIX PRINTERS

[75] Inventors: Michio Matsumoto; Kunio Kitagawa, both of Tokyo, Japan

[73] Assignee: NEC Corporation, Tokyo, Japan

[21] Appl. No.: 558,741

[22] Filed: Dec. 6, 1983

[30] Foreign Application Priority Data

Dec. 6, 1982 [JP]  Japan .............................. 57-213541
Dec. 6, 1982 [JP]  Japan .............................. 57-213542
Apr. 1, 1983 [JP]  Japan .............................. 58-57542

[51] Int. Cl.⁴ .............................................. B41J 3/12
[52] U.S. Cl. .................................. 400/124; 101/93.05; 101/93.48; 310/328; 400/157.2
[58] Field of Search .................... 400/121, 124, 157.2; 101/93.04, 93.05, 93.48; 310/328

[56] References Cited

U.S. PATENT DOCUMENTS 4,435,666  3/1984  Fukui et al. ........................ 310/328

OTHER PUBLICATIONS

*IBM Tech. Disc. Bulletin,* by W. Sakmann, vol. 20, No. 6, Nov., 1977, p. 2263.

*Primary Examiner*—Paul T. Sewell
*Attorney, Agent, or Firm*—Sughrue, Mion, Zinn, Macpeak, and Seas

[57] ABSTRACT

A piezoelectrically driven print mechanism for a dot matrix printer includes a piezoelectric element to which is connected a movement amplification member and electrical drive means for causing expansion and contraction of the piezoelectric element along a first axis in response to the application of an electric potential. A printing pin is connected to the movement amplification member. The expansion or contraction of the piezoelectric element is converted into a much larger movement of the amplification member along a second axis perpendicular to the first axis. This amplified movement is transferred to the printing pin. Several embodiments of the movement amplification member are disclosed.

3 Claims, 14 Drawing Figures

PIEZOELECTRICALLY DRIVEN PRINTING MECHANISM FOR DOT MATRIX PRINTERS

BACKGROUND OF THE INVENTION

The present invention relates to a dot matrix printer, and more particularly to an impact type printing head using piezoelectric elements.

A printer of this kind has a plurality of selectively driven printing needles or printing wires to print figures and letters in the form of dot matrixes on paper. Presently, most of the printers of this kind employ electromagnets for driving the printing needles or wires. For example, a line printer disclosed in the U.S. Pat. No. 3,941,051 comprises plate springs each having a printing needle, permanent magnets displaced at the lower rear of the plate springs, and electromagnets at the upper rear of the plate springs. The plate springs are bent by the attracting magnetic force of the permanent magnet. When one of the electromagnets is energized, the magnetic force of the permanent magnet is offset, and the printing needle is projected toward a platen by the resilient force of the plate spring. However, such a conventional printer requires an excessively large driving current due to the heat generated in a coil of the electromagnets, eddy currents and a hysteresis loss occurring in a yoke and an armature. Therefore, the current capacity of a driving circuit for the electromagnets and the capacity of a power source are necessarily large. This causes the printer to be large and expensive. Furthermore, the use of electromagnets and permanent magnets attached to the reciprocating printing mechanism produces a heavy printing mechanism. Therefore, high printing speed cannot easily be realized.

A matrix printer with piezoelectrically driven printing needles has been proposed in the U.S. Pat. No. 4,193,703 for the purpose of decreasing the printer driving current and for increasing the printing speed. A printing mechanism in this printer has two piezoelectric elements fixed to a frame, a buckling spring fastened to one end of each of the piezoelectric elements, and a printing needle provided on the buckling spring. The buckling spring is bent when the piezoelectric elements are expanded in response to an applied voltage. When this occurs, the printing needle projects an extent corresponding to the degree of expansion of the piezoelectric elements. In this printing mechanism, since a very small expansion of the piezoelectric elements is converted directly into the bending of the buckling spring, the printing needle stroke is only about 0.4 mm. This stroke is not long enough to accomplish a quality dot printing operation. Accordingly, the clarity of the printed letters is poor.

SUMMARY OF THE INVENTION

Therefore, it is an object of the present invention to provide a dot impact printer using piezoelectric elements capable of obtaining a sufficiently long stroke of a printing needle or a printing wire to accomplish quality printing.

According to the present invention, there is provided a printing hammer mechanism comprising magnification or amplification means including link means and lever means for enlarging a very small expansion or contraction of the piezoelectric element, a printing needle or a printing wire being driven by the amplified expansion or contraction of the piezoelectric element.

BRIEF DESCRIPTION OF THE DRAWINGS

The above-mentioned and other objects, features and advantages of the present invention will be better understood from the following detailed description of preferred embodiments taken in conjunction with the accompanying drawings, wherein.

DESCRIPTION OF THE PREFERRED EMBODIMENTS

Figure 1:
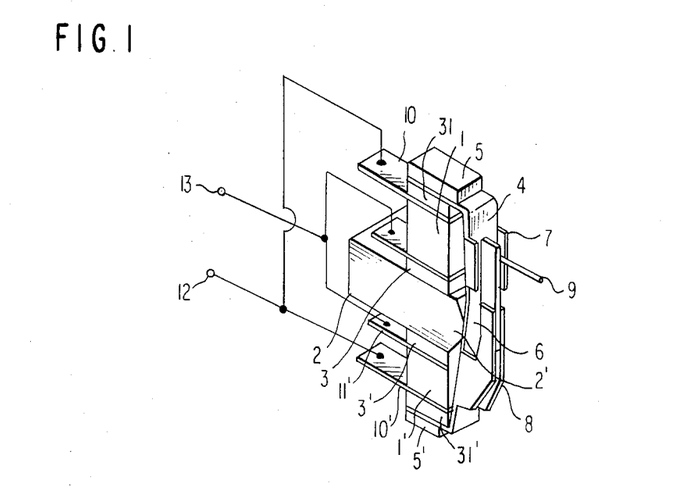
FIG. 1 is a perspective view of a first embodiment of a printing hammer mechanism according to the present invention.

Referring to FIG. 1, piezoelectric elements 1 and 1' are bonded to upper and lower surfaces of a hammer frame 2 via connecting members 3 and 3'. An elastic driven member 4 is fixed to upper and lower surfaces of each of the piezoelectric elements 1 and 1' via connecting members 5, 5', 31 and 31'. The end portions of member 4 are bent at substantially right angles as shown in FIG. 1 for attachment to the piezoelectric elements. The driven member 4 constitutes a elastic plate spring having a bowed, buckling portion 6 located at an intermediate section thereof, folded portions 7 in an upper section thereof, and an arm portion 8 in a lower section thereof. A printing needle 9 is provided at end of the arm portion 8. Since the folded portions 7 and arm portions 8 are formed, the bend of the driven member 4 is restricted in these section. Therefore, the driven member 4 is bent mainly at the buckling portion 6. Thus, the driven member 4 substantially constitutes a link. The end portion (stopper) 2' of the hammer frame 2 is opposed to the driven member 4. The stopper 2' contacts the rear of the driven member 4 at the buckling portion 6 such that the driven member 4 is slightly bent in the forward direction. Plate electrodes 10, 10', 11 and 11' are provided on both end surfaces of the piezoelectric elements 1 and 1'. The plate electrodes 10, 10' are connected to a terminal 12, and the plate electrodes 11, 11' to a terminal 13.

Figure 2A:
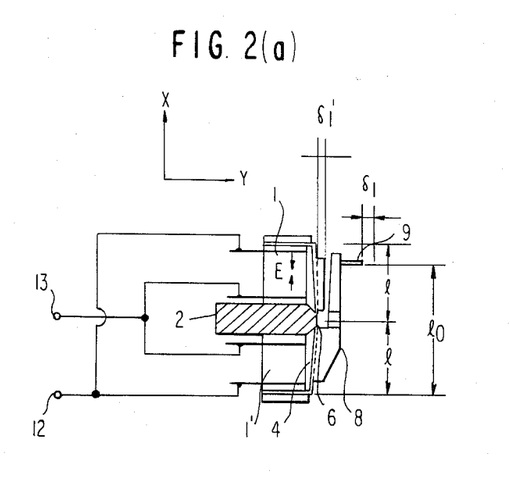
FIGS. 2(a) and 2(b) are side and front elevation views of the printing hammer mechanism shown in FIG. 1.
Figure 2B:
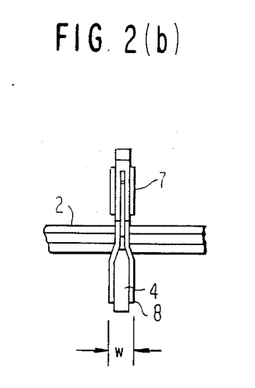

The first embodiment of the printing hammer mechanism will be described in detail with reference to FIGS.

2(a) and 2(b). The length l between upper and lower fixed sections of the member 4 and the buckling portion 6 is 20 mm. The length $l_0$ between the lower fixed section of the member 4 and the printing needle 9 is 35 mm. The driven member 4 has a maximum width w=2 mm at its arm portion 8. When the terminal 12 is grounded and a negative voltage (−200 to −300 V) is applied to the terminal 13, the piezoelectric elements 1 and 1' contract in the X-direction by $\epsilon$ (about 10 μm). Consequently, the driven member 4 receives pressure in the X-direction causing the buckling portion 6 to bow outwardly in the Y-direction. As a result, the arm portion 8 is turned clockwise and the printing needle 9 protrudes in the Y-direction.

A stroke amount $\delta_1$ of the printing needle 9 will now be calculated theoretically. If $2l=l_1$; $2(l-\epsilon)=l_2$, and if the displacement of the buckling portion 6 in the Y-direction is $\delta_1'$, the following equation can be established.

$$l_1 = \int_0^{l_2} \sqrt{1 + \left(\frac{\pi\delta_1'}{l_2}\cos\frac{\pi x}{l_2}\right)^2}\, dx \quad (1)$$

Since $$\left(\frac{\pi\delta_1'}{l_2}\cos\frac{\pi x}{l_2}\right)^2$$

is far smaller than 1, the following approximate equation can be established.

$$l_1 = \int_0^{l_2}\left\{1 + \tfrac{1}{2}\left(\frac{\pi\delta_1'}{l_2}\right)^2\cos^2\frac{\pi x}{l_2}\right\}dx$$

$$= l_2 + \tfrac{1}{4}\frac{(\pi\delta_1')^2}{l_2}$$

Consequently, the following equation can be obtained.

$$\delta_1' = \frac{2}{\pi}\sqrt{l_2(l_1 - l_2)} = \frac{2}{\pi}\sqrt{2\epsilon l_2}$$

$$= \frac{4}{\pi}\sqrt{\epsilon(l-\epsilon)}$$

Since the displacement $\delta_1$ is increased $l_0/l$ times the displacement $\delta_1'$ of the buckling portion 6 by the driven member 4, the following equation regarding a stroke amount $\delta_1$ of the printing needle 9 can be obtained.

$$\delta_1 = \delta_1'\frac{l_0}{l} = \frac{4}{\pi}\sqrt{\epsilon(l-\epsilon)}\;\frac{l_0}{l}$$

When 0.01 mm, 20 mm and 35 mm are substituted for $\epsilon$, l, and $l_0$, respectively, in this equation, the stroke amount $\delta_1 \approx 1$ mm. This indicates that the contraction of the piezoelectric element 1 has been amplified about 100 times.

Figure 3:
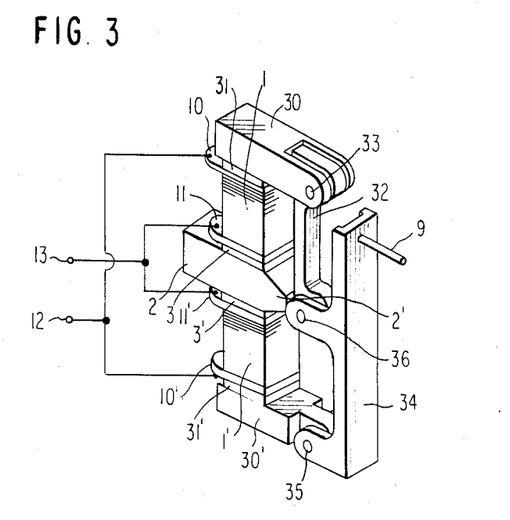
FIG. 3 is a perspective view of a second embodiment of a printing hammer mechanism according to the present invention.
Figure 4A:
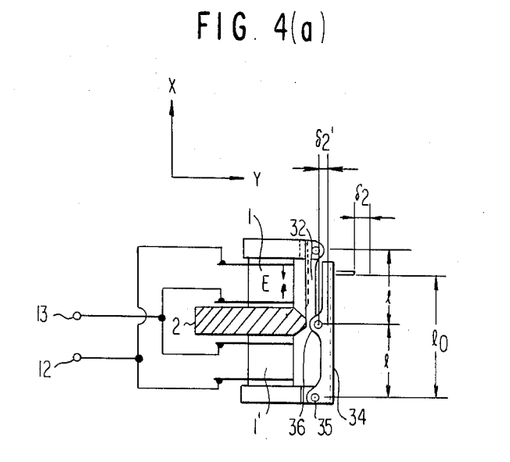
FIGS. 4(a) and 4(b) are side and front elevational views of the printing hammer mechanism shown in FIG. 3.
Figure 4B:
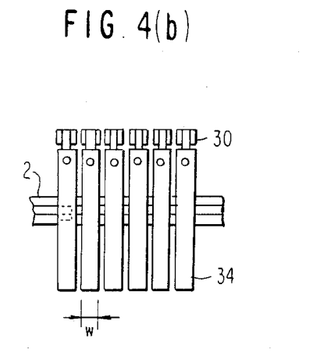

FIGS. 3, 4(a) and (b) show a second embodiment of a printing hammer mechanism according to the present invention by which very small contractions of piezoelectric elements 1 and 1' are amplified via a link means.

In this embodiment, upper and lower fixed links 30 and 30' are secured via connecting members 31 and 31' to piezoelectric elements 1 and 1'. A movable link 32 engages a pivot 33 of the upper fixed link 30 at its upper end. An arm 34 has a printing needle 9, and engages the lower fixed link 30' via a pivot 35 at its lower end. The arm 34 engages the lower end of the movable link 32 via a pivot 36 at its intermediate portion. A stopper 2' of the frame 2 contacts the lower end of the movable link 32 such that the lower end is displaced in the forward Y-direction an extent sufficient to position this lower end forward of the upper end of the link 32.

When the terminal 12 is grounded and a negative voltage (−200 to −300 V) is applied to the terminal 13, the piezoelectric elements 1 and 1' contract in the X-direction by $\epsilon$ (about 10 μm). Consequently, the link means receives pressure from the upper and lower sides thereof, and the movable link 32 and arm 34 are moved outward in the Y-direction. Namely, the arm 34 is turned clockwise around the pivot 35 to protrude the printing needle 9 in the Y-direction. The stroke $\delta_2$ of the printing needle 9 determined in accordance with the same equation used with the first embodiment is approximately 1 mm.

Figure 5:
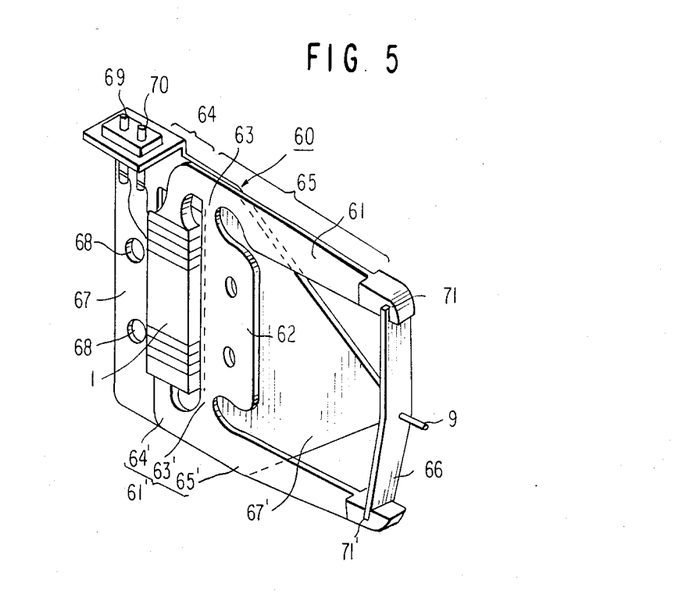
FIG. 5 is a perspective view of a third embodiment of a printing hammer mechanism according to the present invention.
Figure 6A:
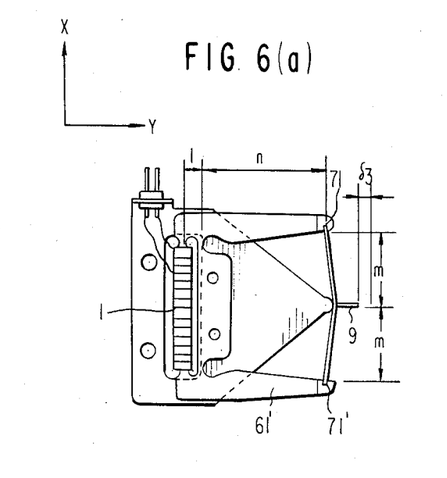
FIGS. 6(a) and 6(b) are side and front elevational views of the printing hammer mechanism shown in FIG. 5.
Figure 6B:
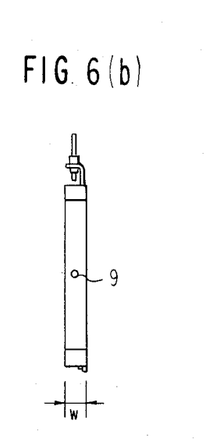

FIGS. 5, 6(a) and 6(b) show a third embodiment of a printing hammer mechanism according to the present invention by which a very small expansion of a piezoelectric element 1 is enlarged by a lever plate 60 to amplify the stroke of a printing needle 9. The lever plate 60 has two levers 61, 61', and a joint plate 62 between the levers 61, 61'. The levers 61 and 61' are turned around fulcrums 63 and 63', respectively. These levers 61 and 61' are divided into shorter arms 64 and 64' and longer arms 65 and 65' with the fulcrums 63 and 63' forming the borders therebetween. Both ends of the piezoelectric element 1 are fixed to the shorter arms 64 and 64'. A band spring 66, having a printing needle 9, is fastened to the free ends of the longer arms 65 and 65'. A hammer frame 67 is riveted to the joint plate 62 of the lever plate 60 and retains the plate 60. A free end portion of the hammer frame 67 constitutes a stopper 67'. This end 67' slightly bends the band spring 66 outwardly in the Y-direction. The hammer plate 67 has mounting bores 68 at its rear portion for fixing the hammer frame 67 to a frame of a printer, and voltage terminals 69 and 70 for applying a voltage to the piezoelectric element 1.

The printing needle 9 is provided at an intermediate portion of the band spring 66. Namely, the lengths m and m between upper and lower fixed end portions 71, 71' of the band spring 66 and the printing needle 9 are equal and may be 20 mm. The longer arms 65 and 65' are n times as long as the shorter arms 64 and 64' with n preferrably being set equal to 8. When a positive voltage (200 to 300 V) is applied between the terminals 69 and 70, the piezoelectric element 1 is expanded in the X-direction by $\epsilon$ (10 μm). Consequently, the lever 61 is turned clockwise around the fulcrum 63, and the lever 61' counter-clockwise around the fulcrum 63'. As a result, the band spring 66 is bent in the Y-direction causing the needle 9 to protrude by $\delta_3$ in the Y-direction.

The stroke distance $\delta_3$ of the printing needle 9 will be theoretically determined. If $2m=m_1$, $2m-n\epsilon=m_2$, the following equation can be established.

$$m_1 = \int_0^{m_2} \sqrt{1 + \left(\frac{\pi \delta_3}{m_2} \cos \frac{\pi x}{m_2}\right)^2} \, dx$$

When this equation is transformed in the same manner as the equation (1), the following equation can be obtained.

$$\delta_3 = \frac{2}{\pi} \sqrt{m_2(m_1 - m_2)} = \frac{2}{\pi} \sqrt{n \epsilon m_2} \quad (2)$$

$$= \frac{2}{\pi} \sqrt{n \epsilon (2m - n \epsilon)}$$

When 0.01 mm, 20 mm and 8 are substituted for $\epsilon$, m and n, respectively, in this equation, the stroke distance $\delta_3 = 1.1$ mm. This indicates that an expansion of the piezoelectric element 1 has been amplified about 110 times.

Figure 7:
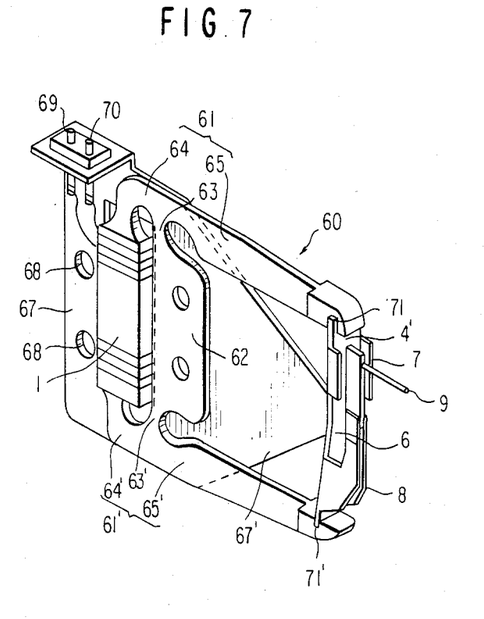
FIG. 7 is a perspective view of a fourth embodiment of a printing hammer mechanism according to the present invention.
Figure 8A:
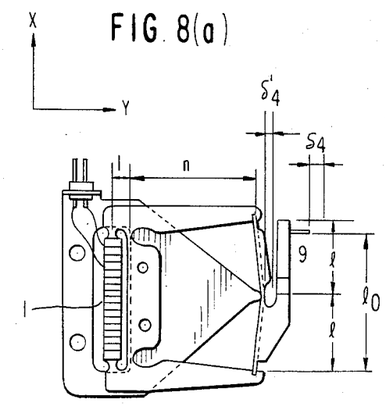
FIGS. 8(a) and 8(b) are side and front elevational views of the printing hammer mechanism shown in FIG. 7.
Figure 8B:
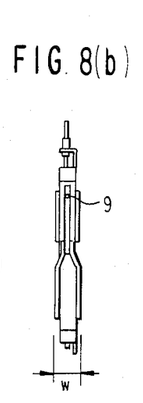

FIGS. 7, 8(a) and 8(b) show a fourth embodiment of a printing hammer mechanism according to the present invention, which is identical with the third embodiment except that the band spring 66 is replaced by the driven member 4 used in the first embodiment. This embodiment enables the stroke of a printing needle 9 to be further amplified. In the fourth embodiment, the driven member 4' has a buckling portion 6, folded portions 7, arm portions 8 and a printing needle 9. The driven member 4' is fixed to the free ends of the longer arms 65, 65' of levers 61, 61'. This driven member 4' is different from the driven member 4 of FIG. 1 in that its upper and lower end portions are not bent at right angles. However, the construction and operation of the driven member 4' are identical with those of the driven member 4.

When a positive voltage (200 to 300 V) is applied between the terminals 69 and 70, a piezoelectric element 1 is expanded by the distance $\epsilon$ in the X-direction. Consequently, a lever 61 is turned clockwise, and a lever 61' counterclockwise, to cause the buckling portion 6 of the driven member 4' to be bent in the Y-direction. As a result, the arm 8 is turned clockwise to protrude the printing needle 9 in the Y-direction.

The stroke distance $\delta_4$ will now be calculated. Since the stroke distance $\delta_4'$ of the buckling portion 6 of the driven member 4' in the Y-direction is equal to $\delta_3$ the stroke distance of the printing needle 9 in the third embodiment, the following equation can be obtained from the equation (2).

$$\delta_4' = \frac{2}{\pi} \sqrt{n \epsilon (2l - n \epsilon)}$$

Since the stroke amount $\delta_4'$ is increased $l_0/l$ times by the driven member 4', the following equation can be obtained in relation to the stroke amount $\delta_4$ of the printing needle 9.

$$\delta_4 = \frac{2}{\pi} \sqrt{n \epsilon (2l - n \epsilon)} \frac{l_0}{l}$$

When 0.01 mm, 20 mm, 35 mm and 8 are substituted for $\epsilon$, $l$, $l_0$ and n, respectively, in this equation, $\delta_4 \div 2$ mm. This indicates that the expansion of the piezoelectric element 1 has been amplified about 200 times.

Figures 9, 10:
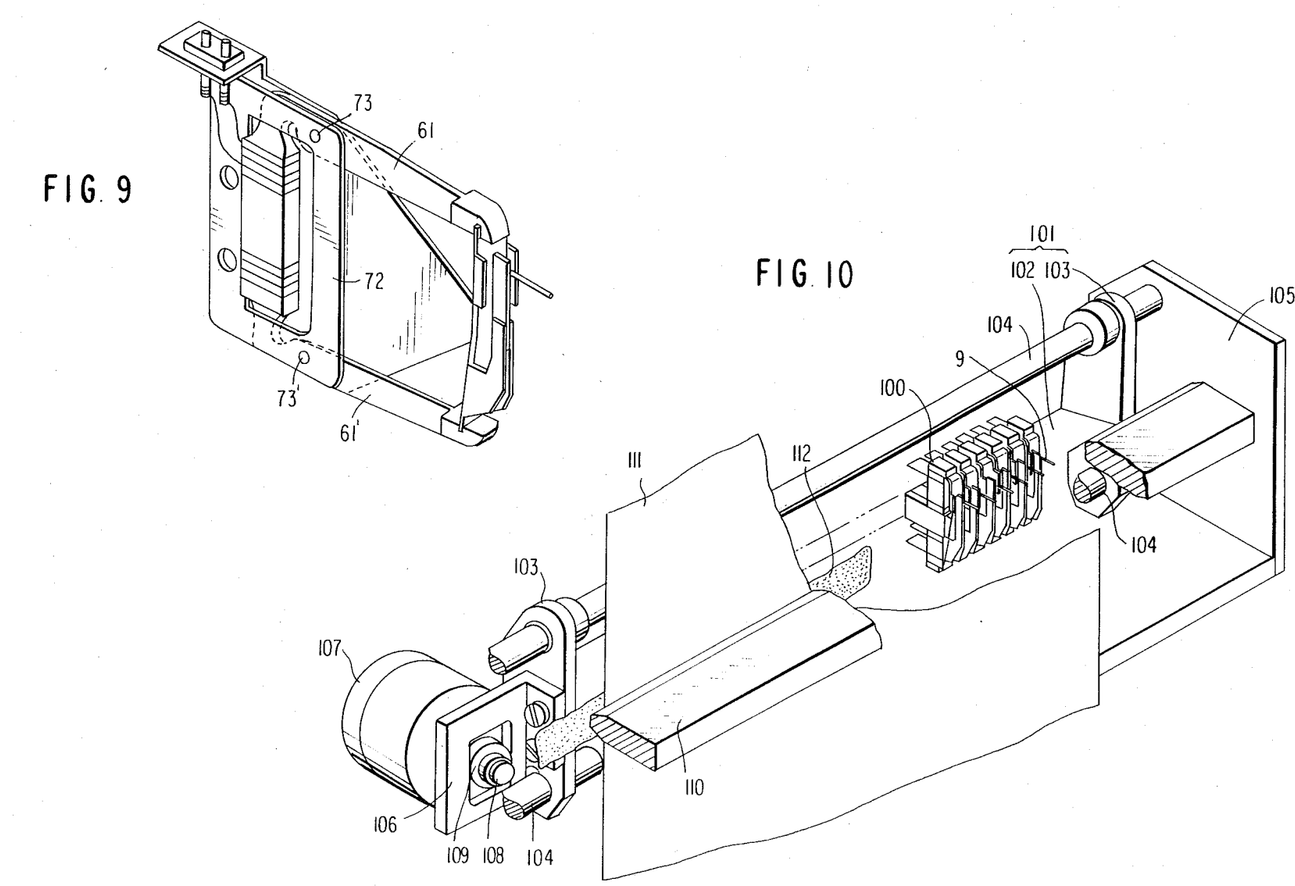
FIG. 9 is a perspective view of a fifth embodiment of a printing hammer mechanism according to the present invention.
FIG. 10 is a partially exploded perspective view of a line printer using the printing hammer mechanism shown in FIG. 1.

FIG. 9 illustrates a fifth embodiment of a printing hammer mechanism according to the present invention. This embodiment is identical with the printing hammer mechanism constituting the fourth embodiment, except that a guide plate 72 having pivots 73 and 73' are further provided. Since the levers 61 and 61' turn around the pivots 73 and 73', a stable stroke distance of the printing needle 9 can be obtained.

The first to fifth embodiments of the printing hammer mechanism according to the present invention can be used as printing hammers for line printers. FIG. 10 shows the first embodiment of the printing hammer mechanism according to the present invention applied to a line printer. A plurality of printing hammer mechanisms 100 are arranged in parallel with one another on a hammer bank frame 101 (only some printing hammer mechanisms are shown in FIG. 10). A plate portion 102 of the hammer bank frame 101 corresponds to the hammer frame 2 shown in FIG. 1. Arms 103 of the hammer bank frame 101 are mounted slidably on two guide shafts 104. The guide shafts 104 are supported on a printer frame 105, so that the hammer bank frame 101 can be moved laterally. A bracket 106 has an opening and is fixed to one of the arms 103. A motor 107 has an eccentric cam 109 on its shaft 108. The eccentric cam 109 engages the opening of the bracket 106. Therefore, when the motor 107 rotates, the hammer bank 101 is reciprocated on the guide shafts 104. A platen 110 is supported on the printer frame 105 so as to oppose printing needles 9 of the plurality of printing hammer mechanisms 100. The platen 110 is spaced by a predetermined distance from the printing needles 9. The printer paper 111 is disposed between the printing needles 9 and platen 110. Printing needles 9 print characters and figures in matrix form on the paper 111 via an ink ribbon 112. During the dot printing, the hammer bank 101 is reciprocally moved by the motor 107 a predetermined distance (substantially equal to the distance between two adjacent printing needles 9) in a predetermined cycle. While the hammer bank 101 is moved in one direction, the printing hammer mechanisms 100 are operated selectively, so that a selected printing needle 9 protrudes toward the platen 110 to carry out the dot printing of one horizontal line on the paper 11. Then, the printing paper 111 is raised by a distance corresponding to the height of one dot. While the hammer bank 101 is then moved in the other direction, the dot printing of a subsequent horizontal line on the paper 111 is carried out. These operations are carried out repeatedly to continuously print characters or figures on the paper 111 in matrix form.

According to the present invention as described above, a very small expansion or contraction of piezoelectric elements is amplified to produce a relatively long stroke of the printing needles or wires. Accordingly, a sufficiently large stroke of the printing needles or wires for dot printing can be obtained, and clarity of the printed characters and figures on the paper is realized.

What is claimed is:

1. A printing hammer mechanism comprising:
a piezoelectric element having an electrode, to which a voltage is applied to expand and contract said piezoelectric element along a first axis, and first and second end surfaces intersecting said first axis;
a link means connected to said first and second end surfaces of said piezoelectric element intersecting said first axis and movable along a second axis perpendicular to said first axis, said link means having a first arm portion engaging said first end surface and a second arm portion engaging said second end surface, said second arm portion being disposed substantially parallel to said first axis and having the length longer than said first arm portion, the end of said first arm portion not engaging said first end surface being connected to the intermediate portion of said second arm portion; and a printing element fixed to the free end of said second arm portion such that said printing element is moved in the direction of said second axis in response to the expanding and contracting of said piezoelectric element.

2. The printing hammer mechanism as claimed in claim 1, wherein said link means comprises a band spring having a first section including folded portions functioning as said first arm portion and a second section having said second arm portion, said first and said second sections being integrally connected to form a buckling.

3. The printing mechanism as claimed in claim 1, wherein said link means includes a first rigid link portion fastened to said first end surface, said first arm portion being a first rigid arm portion pivotably engaging said first rigid link portion, and a second rigid link portion fastened to said second end surface, said second arm portion being a second rigid arm portion pivotably engaging said second rigid link portion, the end of said first rigid arm portion not engaging said first rigid link portion being connected to the intermediate portion of said second rigid arm portion by a pivot means.

* * * * *

UNITED STATES PATENT AND TRADEMARK OFFICE
CERTIFICATE OF CORRECTION

PATENT NO. : 4,547,086

DATED : October 15, 1985

INVENTOR(S) : Michio Matsumoto, et al.

It is certified that error appears in the above-identified patent and that said Letters Patent is hereby corrected as shown below:

Column 5, line 66, "$4 \div 2$" should read -- $4 \stackrel{\div}{=} 2$ --;

Column 6, line 44, "paper 11" should read -- paper 111 --.

Signed and Sealed this

Twentieth Day of May 1986

[SEAL]

Attest:

DONALD J. QUIGG

Attesting Officer

Commissioner of Patents and Trademarks